(12) United States Patent
Matsuhara et al.

(10) Patent No.: US 12,374,690 B2
(45) Date of Patent: Jul. 29, 2025

(54) GRAPHITE-BASED NEGATIVE ELECTRODE ACTIVE MATERIAL

(71) Applicant: Prime Planet Energy & Solutions, Inc., Tokyo (JP)

(72) Inventors: Shinsuke Matsuhara, Miyoshi (JP); Yusuke Araki, Nagoya (JP); Yutaka Oyama, Toyota (JP); Kiyohiko Nakano, Toyota (JP); Shuhei Takeshita, Nagakute (JP)

(73) Assignee: PRIME PLANET ENERGY & SOLUTIONS, INC., Tokyo (JP)

( * ) Notice: Subject to any disclaimer, the term of this patent is extended or adjusted under 35 U.S.C. 154(b) by 748 days.

(21) Appl. No.: 17/572,632

(22) Filed: Jan. 11, 2022

(65) Prior Publication Data

US 2022/0223863 A1     Jul. 14, 2022

(30) Foreign Application Priority Data

Jan. 14, 2021   (JP) ................................ 2021-004194

(51) Int. Cl.
| | |
|---|---|
| *H01M 4/583* | (2010.01) |
| *H01M 4/02* | (2006.01) |
| *H01M 4/04* | (2006.01) |
| *H01M 4/133* | (2010.01) |
| *H01M 10/0525* | (2010.01) |

(52) U.S. Cl.
CPC ........... *H01M 4/583* (2013.01); *H01M 4/043* (2013.01); *H01M 4/133* (2013.01); *H01M 10/0525* (2013.01); *H01M 2004/021* (2013.01); *H01M 2004/027* (2013.01)

(58) Field of Classification Search
CPC .......... H01M 10/052; H01M 10/0525; H01M 4/043; H01M 4/133; H01M 4/1393; H01M 4/366; H01M 4/583; H01M 2004/021; H01M 2004/027
See application file for complete search history.

(56) References Cited

U.S. PATENT DOCUMENTS

| | | | |
|---|---|---|---|
| 2001/0033822 A1* | 10/2001 | Ishii | ...................... C01B 32/205 |
| | | | 423/448 |
| 2005/0266314 A1 | 12/2005 | Sheem et al. | |
| 2007/0009801 A1* | 1/2007 | Inagaki | ............... H01M 4/1391 |
| | | | 429/231.95 |

(Continued)

FOREIGN PATENT DOCUMENTS

| | | |
|---|---|---|
| CN | 104136376 A | 11/2014 |
| CN | 107112536 A | 8/2017 |

(Continued)

*Primary Examiner* — Haroon S. Sheikh
(74) *Attorney, Agent, or Firm* — HAUPTMAN HAM, LLP

(57) ABSTRACT

Provided is a graphite-based negative electrode active material that can impart both high output characteristics and high cycle characteristics to a nonaqueous electrolyte secondary battery. The graphite-based negative electrode active material disclosed herein is made up of particles having, in a cross-sectional view, a flat central portion made up of graphite, and a porous accumulation portion made up of accumulated graphite, on both sides of the flat central portion. The graphite that makes up the flat central portion is present more densely than the graphite that makes up the porous accumulation portion.

4 Claims, 3 Drawing Sheets

(56) References Cited

U.S. PATENT DOCUMENTS

| | | | |
|---|---|---|---|
| 2007/0128518 A1 | 6/2007 | Uono et al. | |
| 2012/0135303 A1 | 5/2012 | Hong et al. | |
| 2014/0377660 A1 | 12/2014 | Fukui et al. | |
| 2017/0110729 A1* | 4/2017 | Tsuchiya | H01M 4/587 |
| 2017/0187041 A1* | 6/2017 | Yamada | H01M 4/583 |
| 2018/0013146 A1* | 1/2018 | Yamada | H01M 4/587 |
| 2019/0013519 A1 | 1/2019 | Matsumoto et al. | |
| 2019/0058192 A1 | 2/2019 | Tsuchiya et al. | |
| 2020/0185721 A1 | 6/2020 | Yamada et al. | |
| 2021/0066707 A1* | 3/2021 | Miyagi | H01M 4/1393 |
| 2022/0293942 A1* | 9/2022 | Matsumoto | H01M 4/364 |

FOREIGN PATENT DOCUMENTS

| | | | |
|---|---|---|---|
| CN | 108432003 A | 8/2018 | |
| JP | H10294111 A | 11/1998 | |
| JP | 200560150 A | 3/2005 | |
| JP | 2005302725 A | 10/2005 | |
| JP | 2007179956 A | 7/2007 | |
| JP | 2007220324 A | 8/2007 | |
| JP | 2011503782 A | 1/2011 | |
| JP | 2016091632 A | 5/2016 | |
| JP | 2016186912 A | 10/2016 | |
| JP | 2019145529 A | 8/2019 | |
| WO | 2005078829 A1 | 8/2005 | |
| WO | 2016113952 A1 | 7/2016 | |

\* cited by examiner

GRAPHITE-BASED NEGATIVE ELECTRODE ACTIVE MATERIAL

BACKGROUND OF THE INVENTION

1. Field of the Invention

The present disclosure relates to a graphite-based negative electrode active material. The present application claims priority based on Japanese Patent Application No. 2021-004194 filed on Jan. 14, 2021, the entire contents of which are incorporated in the present specification by reference.

2. Description of the Related Art

In recent years, lithium ion secondary batteries have come to be suitably used as portable power sources in personal computers, mobile terminals and the like, and as power sources for vehicle drive in battery electric vehicles (BEV), hybrid electric vehicles (HEV), and plug-in hybrid electric vehicles (PHEV).

Ordinarily, graphite-based negative electrode active materials are used in the negative electrode of nonaqueous electrolyte secondary batteries, in particular lithium ion secondary batteries. The widespread use of nonaqueous electrolyte secondary batteries has been accompanied by a demand for higher battery performance. One approach towards increasing battery performance involves improving the graphite-based negative electrode active material. As an example of an improved graphite-based negative electrode active material, Japanese Patent Application Publication No. 2019-145529 discloses a graphite-based negative electrode active material resulting from composing a plurality of flat-shaped graphite particles and spherical graphite particles. Japanese Patent Application Publication No. 2019-145529 indicates that the load characteristics of a lithium ion secondary battery that utilizes such a graphite-based negative electrode active material are improved in a case where an R value of the graphite-based negative electrode active material, derived from a Raman measurement, lies within a predetermined range, and a pore volume for a predetermined diameter lies within a predetermined range.

SUMMARY OF THE INVENTION

As a result of diligent research, however, the inventor has found that insufficient output characteristics and insufficient cycle characteristics are problems of conventional art in nonaqueous electrolyte secondary batteries that utilize a graphite-based negative electrode active material.

In view of the above, it is an object of the present disclosure to provide a graphite-based negative electrode active material that can impart high output characteristics and high cycle characteristics to a nonaqueous electrolyte secondary battery.

A graphite-based negative electrode active material disclosed herein is made up of particles having, in a cross-sectional view, a flat central portion made up of graphite, and a porous accumulation portion made up of accumulated graphite, on both sides of the flat central portion. The graphite that makes up the flat central portion is present more densely than the graphite that makes up the porous accumulation portion. By virtue of such a configuration, a graphite-based negative electrode active material is provided that can impart both high output characteristics and high cycle characteristics to a nonaqueous electrolyte secondary battery.

In a desired aspect of the graphite-based negative electrode active material disclosed herein, an average aspect ratio of the flat central portion is not less than 1.8 but not more than 12. Such a configuration can impart particularly high output characteristics and particularly high cycle characteristics to a nonaqueous electrolyte secondary battery.

In a desired aspect of the graphite-based negative electrode active material disclosed herein, a pore volume for a range of pore diameter from 0.01 µm to 0.1 µm is not less than 0.025 mL/g but not more than 0.045 mL/g. Such a configuration can impart particularly high output characteristics and particularly high cycle characteristics to a nonaqueous electrolyte secondary battery.

In a desired aspect of the graphite-based negative electrode active material disclosed herein, a ratio of the thickness of the porous accumulation portion relative to a minor diameter of the flat central portion is not less than 1.25 but not more than 2.5. Such a configuration can impart particularly high output characteristics and particularly high cycle characteristics to a nonaqueous electrolyte secondary battery.

The graphite-based negative electrode active material disclosed herein can be suitably produced in accordance with a production method that includes mixing two types of scaly graphite having different average particle sizes; and composing the two types of scaly graphite by applying an impact force, a compressive force and a shear force to the obtained mixture.

In another aspect, the nonaqueous electrolyte secondary battery disclosed herein has a positive electrode, a negative electrode, and a nonaqueous electrolyte. The negative electrode includes the above graphite-based negative electrode active material. By virtue of such a configuration, a nonaqueous electrolyte secondary battery is provided that has high output characteristics and high cycle characteristics.

DESCRIPTION OF THE PREFERRED EMBODIMENTS

Figure 1:
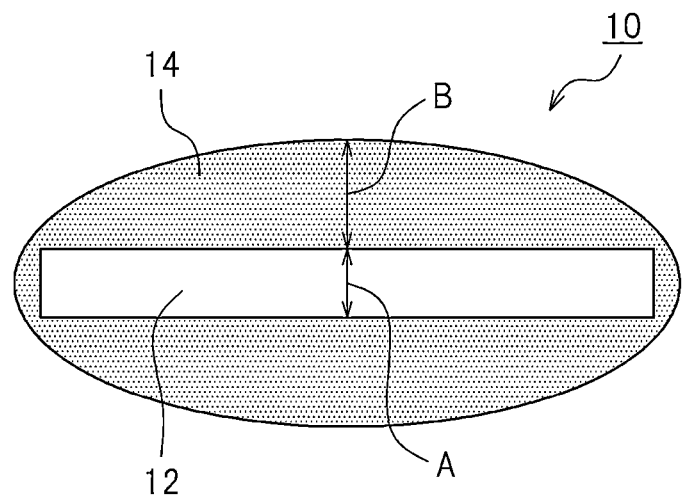
FIG. 1 is a schematic cross-sectional diagram of an example of a graphite-based negative electrode active material according to an embodiment of the present disclosure.

Embodiments according to the present disclosure will be explained hereafter with reference to accompanying drawings. It should be noted that matters which are not specifically mentioned in the present specification and are necessary for implementation of the present disclosure can be understood as design matters of those skilled in the art based on the conventional art in the field. The disclosure can be realized on the basis of the disclosure of the present specification and common technical knowledge in the relevant technical field. In the drawings below, members and portions that elicit identical effects are denoted with identical reference symbols. The dimensional relationships (length, width, thickness and so forth) in the drawings do not reflect actual dimensional relationships.

It should be noted that in the present specification, the term "secondary battery" denotes a power storage device in general that is capable of being charged and discharged repeatedly, and encompasses power storage elements such as so-called storage batteries and electrical double layer capacitors. In the present specification, the term "lithium ion secondary battery" denotes a secondary battery that utilizes lithium ions as charge carriers, and in which charging and discharge are realized as a result of movement of charge with lithium ions, between a positive electrode and a negative electrode.

The graphite-based negative electrode active material according to the present embodiment is made up of particles that have, in a cross-sectional view, a flat central portion made up of graphite, and a porous accumulation portion made up of accumulated graphite, on both sides of the flat central portion. The graphite that makes up the flat central portion is present more densely than the graphite that makes up the porous accumulation portion. FIG. 1 illustrates schematically a cross section of an example of a graphite-based negative electrode active material according to the present embodiment.

As illustrated in FIG. 1, a graphite-based negative electrode active material 10 has a plurality of particles having a flat central portion 12, and a porous accumulation portion 14 on both sides of the flat central portion 12. Although the graphite-based negative electrode active material 10 is made up of a plurality of particles, only one particle is depicted in FIG. 1, for convenience.

The central portion 12 is made up of graphite, and constitutes a core portion of the particles that make up the graphite-based negative electrode active material 10. The type of graphite that makes up the flat central portion 12 is not particularly limited, and typically the flat central portion 12 is at least partially made up of scaly graphite. Specifically, the flat central portion 12 is typically made up of scaly graphite, or graphite in which part (in particular edges) of scaly graphite is missing. The flat central portion 12 is typically made up of a single graphite particle, and is accordingly made up of a solid particle. However, the flat central portion 12 may have voids, as long as graphite is present more densely in the flat central portion 12 than in the porous accumulation portion 14.

In the illustrated example, the flat central portion 12 has a rectangular shape, but the shape of the flat central portion 12 is not particularly limited as long as the shape is flat. The flat central portion 12 may be, for instance, of elliptical shape.

The flat central portion 12 typically has a flat plate-like three-dimensional shape. Accordingly, the cross-sectional view is typically a cross-sectional view in the thickness direction of the flat central portion 12.

In the porous accumulation portion 14, a plurality of graphite particles is accumulated, and the porous accumulation portion 14 constitutes a shell portion of the particles that make up the graphite-based negative electrode active material 10. Upon accumulation of a plurality of graphite particles, gaps are formed between the graphite particles, and as a result, the porous accumulation portion 14 has numerous pores derived from such gaps. The porous accumulation portion 14 is made porous in this way.

The type of graphite that makes up the porous accumulation portion 14 is not particularly limited, and typically the porous accumulation portion 14 is constituted through accumulation of at least a part of scaly graphite.

In the illustrated example, the porous accumulation portion 14 completely surrounds the flat central portion 12. However, the porous accumulation portion 14 need not completely surround the flat central portion 12, so long as the porous accumulation portion 14 lies on both sides of the flat central portion 12. For instance, the porous accumulation portion 14 may be formed on both sides of the flat central portion 12, without surrounding the flat central portion 12 completely, so that just the end faces of the flat central portion 12 are exposed.

The porous accumulation portion 14 has a large number of pores which are sites at which graphite is not present. Therefore, graphite is present more densely in the flat central portion 12 than in the porous accumulation portion 14. The fact that graphite is present more densely in the flat central portion 12 than in the porous accumulation portion 14 can be ascertained by acquiring a cross-sectional scanning electron micrograph (cross-sectional SEM image) of the graphite-based negative electrode active material 10.

In a cross-sectional SEM image, in particular, the site of the flat central portion 12 at which graphite is present can be identified as dark gray, the sites of the porous accumulation portion 14 at which graphite is present can be identified as light gray, and the voids between particles that make up the graphite-based negative electrode active material 10 can be identified as black. The brightness of gray can be easily grasped herein through the use of image analysis software. Typically, in a case, for instance, where image analysis software (for example "ImageJ" distributed by the Laboratory for Optical and Computational Instrumentation of the University of Wisconsin) is used, a difference between the average value of a luminance histogram of the porous accumulation portion 14 and the average value of a luminance histogram of the flat central portion 12 (i.e., average value of a luminance histogram of the porous accumulation portion 14–average value of a luminance histogram of the flat central portion 12) is 5 or higher. Typically, the average value of a luminance histogram of the porous accumulation portion 14 is 100 or higher, and the average value of the luminance histogram of the flat central portion 12 is 95 or lower. However, a region where the average value of the luminance histogram is 40 or lower is regarded herein as voids between particles. It should be noted that raw data without contrast adjustment is used to calculate the average values of the luminance histograms. Respective regions taking up 20% or more of the area of the flat central portion 12 and of the area of the porous accumulation portion 14 are selected, to calculate average values of luminance histograms.

The overall three-dimensional shape of the particles that make up the graphite-based negative electrode active material 10 is not particularly limited. The particles may be in, for instance, an elliptical-spherical shape or a shape close to an elliptical-spherical shape, and thus may be in, for instance, a spherical shape, a cylindrical shape or an indefinite shape.

In the graphite-based negative electrode active material 10, the high-density (or solid) flat central portion 12 allows suppressing expansion/contraction of the active material accompanying charging and discharging; in turn, this allows improving cycle characteristics (in particular resistance to capacity deterioration). In the low-density porous accumulation portion 14 on both sides of the flat central portion 12, by contrast, an electrolyte solution can permeate into the pores of the porous accumulation portion 14, and accordingly the reaction surface area becomes larger, which in turn makes it possible to lower resistance. Therefore, the graphite-based negative electrode active material 10 can impart both high output characteristics and high cycle characteristics to a nonaqueous electrolyte secondary battery.

In the present specification, the term "flat" denotes a shape having an aspect ratio of 1.5 or higher. In the graphite-based negative electrode active material 10 according to the present embodiment, therefore, the average aspect ratio of the flat central portion 12, i.e. average of the ratio of the major diameter relative to the minor diameter (or the ratio of the long side relative to the short side) is 1.5 or higher. When the average aspect ratio is too low, the flat central portion 12 tends to not readily hold a sufficient amount of the porous accumulation portion 14; as a result, this tends to diminish the effect of the present disclosure. Accordingly, the average aspect ratio of the flat central portion 12 is desirably 1.6 or higher, more desirably 1.8 or higher, and yet more desirably 2.05 or higher. When, by contrast, the average aspect ratio is excessively high, expansion/contraction of the graphite-based negative electrode active material 10 tends to increase, which in turn tends to diminish the effect of the present disclosure. Therefore, the average aspect ratio of the flat central portion 12 is desirably 20 or lower, more desirably 15 or lower, yet more desirably 12 or lower, and most desirably 10.5 or lower.

The aspect ratio of the flat central portion 12 can be obtained by acquiring a cross-sectional SEM image of the graphite-based negative electrode active material 10, determining then the aspect ratio of 20 or more particles arbitrarily selected, and calculating then the average value thereof.

The pore volume of the graphite-based negative electrode active material 10 for a range of pore diameter from 0.01 μm to 0.1 μm is not particularly limited. From the viewpoint of achieving higher electrolyte solution permeability in the porous accumulation portion 14, the pore volume of the graphite-based negative electrode active material 10, for a range of pore diameter from 0.01 μm to 0.1 μm, is desirably not less than 0.020 mL/g but not more than 0.050 mL/g, more desirably not less than 0.025 mL/g but not more than 0.045 mL/g, and yet more desirably not less than 0.031 mL/g but not more than 0.041 mL/g. The effect of the present disclosure is yet more pronounced when the pore volume lies within such ranges.

The pore volume for a range of pore diameter from 0.01 μm to 0.1 μm can be measured in accordance with a mercury intrusion porosimetry.

The minor diameter of the flat central portion 12 in the graphite-based negative electrode active material 10 (dimension denoted by A in FIG. 1; short side in the case of a rectangular shape) is not particularly limited. The minor diameter A (average value) of the flat central portion 12 is desirably not less than 0.5 μm but not more than 10 μm, more desirably not less than 1 μm but not more than 7.5 μm, and yet more desirably not less than 1.3 μm but not more than 6.6 μm.

The thickness of the porous accumulation portion 14 of the graphite-based negative electrode active material 10 (dimension denoted by B in FIG. 1; maximum thickness of the porous accumulation portion 14) is not particularly limited. The thickness B (average value) of the porous accumulation portion 14 is desirably not less than 1 μm but not more than 15 μm, more desirably not less than 1.5 μm but not more than 12 μm, and yet more desirably not less than 2 μm but not more than 10 μm.

A ratio (B/A) of the thickness B (average value) of the porous accumulation portion 14 relative to the minor diameter A (average value) of the flat central portion 12 of the graphite-based negative electrode active material 10 is not particularly limited. The ratio (B/A) is desirably not less than 1.0 but not more than 3.0, more desirably not less than 1.25 but not more than 2.5, and yet more desirably not less than 1.52 but not more than 2.27. When the ratio (B/A) lies within such ranges, there is achieved a better balance between the effect of suppressing expansion/contraction by the flat central portion 12, and electrolyte solution permeability in the porous accumulation portion 14, and the effect of the present disclosure is more pronounced.

The minor diameter A of the flat central portion 12 and the thickness B of the porous accumulation portion 14 can be determined by acquiring a cross-sectional electron micrograph (for example, a cross-sectional SEM image) of the graphite-based negative electrode active material 10, measuring then the minor diameter A and thickness B of 20 or more particles arbitrarily selected, and calculating then respective average values of the minor diameter A and thickness B.

The graphite-based negative electrode active material according to the present embodiment can be suitably produced in accordance with the method below. The graphite-based negative electrode active material according to the present embodiment is not limited to being a material produced in accordance with the production method below.

A desired production method of the graphite-based negative electrode active material according to the present embodiment includes mixing two types of scaly graphite having different average particle sizes; and composing the two types of scaly graphite by applying an impact force, a compressive force and a shear force to the obtained mixture.

Through the use of two types of scaly graphite having different average particle sizes, the scaly graphite with a larger average particle size (hereafter also referred to as "scaly graphite (L)") constitutes a core portion (i.e. the flat central portion), and the scaly graphite with a smaller average particle size (hereafter also referred to as "scaly graphite (S)") accumulates to constitute a shell portion (i.e. the porous accumulation portion). In addition to the two types of scaly graphite, a third type of scaly graphite having a different average particle size may be further mixed in, so long as the above-described graphite-based negative electrode active material is obtained.

A difference in average particle size between the two types of scaly graphite is not particularly limited, so long as the above-described graphite-based negative electrode active material is obtained, but is desirably not less than 5 μm but not more than 20 μm, and more desirably not less than 7.5 μm but not more than 15 μm. The average particle size of the scaly graphite can be determined as a volume-cumulative particle size D50 measured using a particle size distribution measuring device of laser diffraction/scattering type. Herein, there are desirably used scaly graphite (L) having an average particle size (D50) of not less than 12.5 μm but not more than 17.5 μm and scaly graphite (S) having an average particle size (D50) of not less than 2.5 μm but not more than 7.5 μm.

The mixing ratio of the scaly graphite (L) and the scaly graphite (S) is not particularly restricted, so long as the above-described graphite-based negative electrode active material is obtained, but desirably the proportion of scaly graphite (L) is the higher one. A mass ratio (scaly graphite (L): scaly graphite (S)) of the scaly graphite (L) and the scaly graphite (S) is desirably from 6:4 to 9:1.

The scaly graphite (L) and the scaly graphite (S) can be mixed in accordance with a known method.

The method for composing the scaly graphite (L) and the scaly graphite (S) by applying an impact force, a compressive force and a shear force to the mixture is not particularly limited, but it is desirably a method in which there is used a known dry-type particle composing device capable of applying an impact force, a compressive force and a shear force (in particular, a dry-type particle composing device provided with a rotor capable of rotating at high speed). Examples of such dry-type particle composing devices include the "Nobilta" series manufactured by Hosokawa Micron Corporation. Mixing and composing can be performed by charging the scaly graphite (L) and the scaly graphite (S) into a dry-type particle composing device.

The treatment conditions of the dry-type particle composing device may be determined as appropriate so that the above-described graphite-based negative electrode active material is obtained. The scaly graphite (L) may crack due to the impact force, compressive force and shear force. If these forces are excessively large or the application time of these forces is too prolonged, the scaly graphite (L) suffers excessive cracking, and the core portion fails to be formed. The treatment conditions by the dry-type particle composing device can be determined as appropriate with the above in mind. When using a dry-type particle composing device provided with a rotor capable of rotating at high speed, the rotational speed of the rotor of the device is, for instance, 3000 rpm or higher (desirably not less than 3000 rpm but not more than 5000 rpm), and the treatment time is, for instance, not less than 60 minutes but not more than 180 minutes.

A secondary battery can be constructed in accordance with a known method, using the graphite-based negative electrode active material according to the present embodiment. Specifically, the graphite-based negative electrode active material according to the present embodiment may be used as a negative electrode active material, in a known secondary battery that utilizes a graphite-based negative electrode active material.

By using the graphite-based negative electrode active material according to the present embodiment in a nonaqueous electrolyte secondary battery, high output characteristics and high cycle characteristics (in particular, resistance to capacity deterioration upon repeated charging and discharge) can be imparted to the nonaqueous electrolyte secondary battery. The graphite-based negative electrode active material according to the present embodiment is typically a graphite-based negative electrode active material for secondary batteries, desirably a graphite-based negative electrode active material for nonaqueous electrolyte secondary batteries (in particular for lithium ion secondary batteries). The graphite-based negative electrode active material according to the present embodiment can also be used in an all-solid-state secondary battery provided with a solid electrolyte.

In another aspect, therefore, a nonaqueous electrolyte secondary battery according to the present embodiment has a positive electrode, a negative electrode, and a nonaqueous electrolyte, and the negative electrode includes the above graphite-based negative electrode active material.

The nonaqueous electrolyte secondary battery according to the present embodiment will be explained in detail below on the basis of an example of a flat square lithium ion secondary battery having a flat-shaped wound electrode body and a flat-shaped battery case. However, the nonaqueous electrolyte secondary battery according to the present embodiment is not limited to the example explained below.

Figure 2:
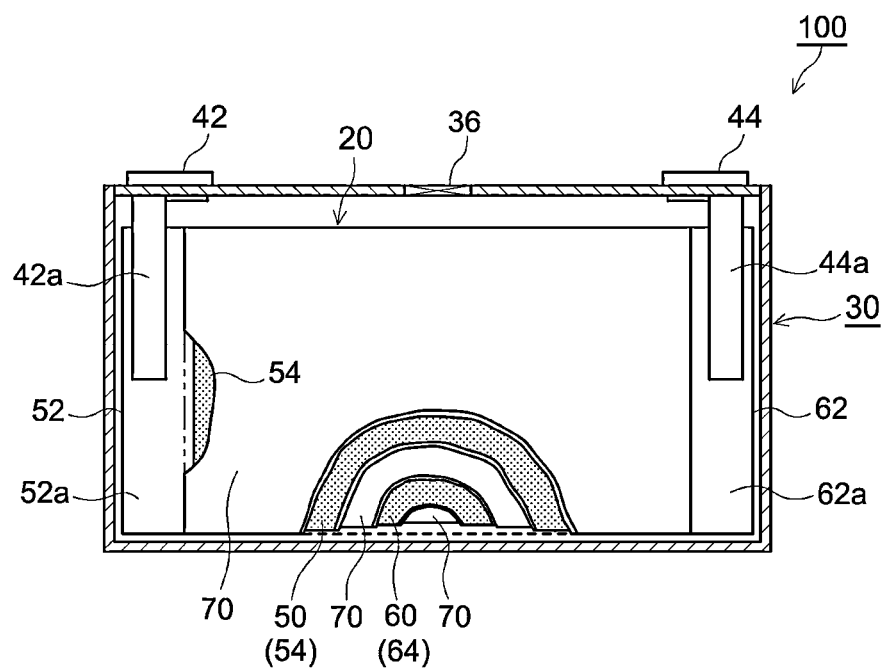
FIG. 2 is a cross-sectional diagram illustrating schematically the configuration of a lithium ion secondary battery constructed using a graphite-based negative electrode active material according to an embodiment of the present disclosure.

A lithium ion secondary battery 100 illustrated in FIG. 2 is a sealed battery constructed by accommodating a flat-shaped wound electrode body 20 and a nonaqueous electrolyte (not shown) in a flat square battery case (i.e. an outer container) 30. The battery case 30 is provided with a positive electrode terminal 42 and a negative electrode terminal 44 for external connection, and with a thin-walled safety valve 36 set to relieve internal pressure in the battery case 30 when the internal pressure rises to or above a predetermined level. Positive and negative electrode terminals 42, 44 are electrically connected to positive and negative electrode collector plates 42a, 44a, respectively. For instance, a lightweight metallic material having good thermal conductivity, such as aluminum, can be used as the material of the battery case 30.

Figure 3:
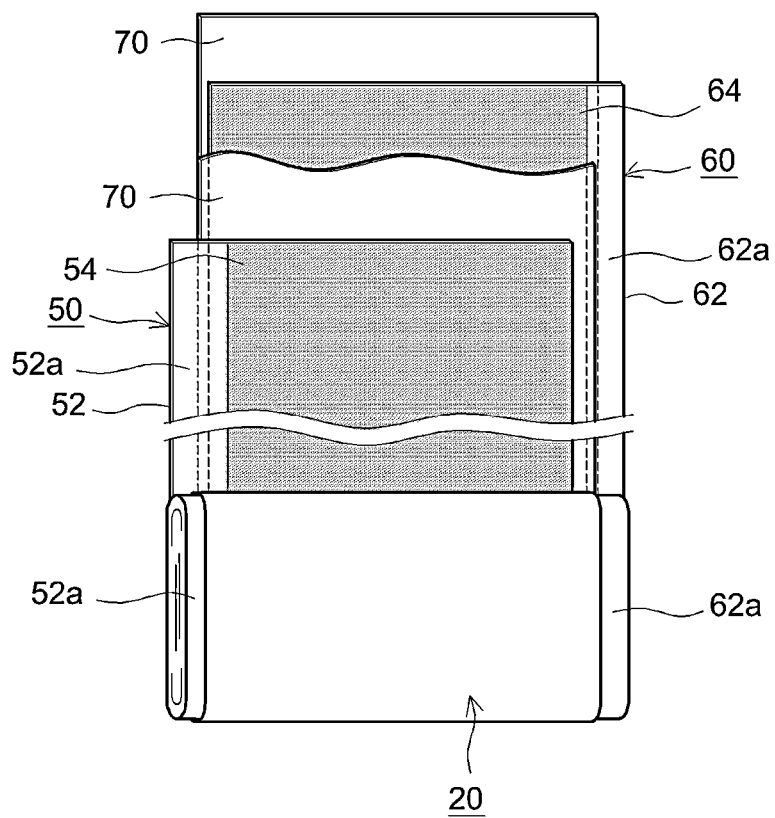
FIG. 3 is a schematic exploded diagram illustrating the configuration of a wound electrode body of the lithium ion secondary battery of FIG. 2.

As illustrated in FIG. 2 and FIG. 3, the wound electrode body 20 has a configuration resulting from laminating a positive electrode sheet 50 and a negative electrode sheet 60 with two elongated separator sheets 70 interposed in between, and winding the resulting laminate in the longitudinal direction. The positive electrode sheet 50 has a configuration in which a positive electrode active material layer 54 is formed in the longitudinal direction on one or both faces (herein both faces) of an elongated positive electrode collector 52. The negative electrode sheet 60 has a configuration in which a negative electrode active material layer 64 is formed in the longitudinal direction on one or both faces (herein both faces) of an elongated negative electrode collector 62. A positive electrode active material layer non-formation section 52a (i.e. exposed portion of the positive electrode collector 52 at which the positive electrode active material layer 54 is not formed) and a negative electrode active material layer non-formation section 62a (i.e. exposed portion of the negative electrode collector 62 at which the negative electrode active material layer 64 is not formed) are formed so as to respectively protrude outward from either edge of the wound electrode body 20 in a winding axis direction thereof (i.e. sheet width direction perpendicular to the longitudinal direction). The positive electrode active material layer non-formation section 52a and the negative electrode active material layer non-formation section 62a are joined to the positive electrode collector plate 42a and the negative electrode collector plate 44a, respectively.

A known positive electrode collector used in lithium ion secondary batteries can be used as the positive electrode collector 52, and examples thereof include sheets or foils made of a metal of good conductivity (for instance, aluminum, nickel, titanium or stainless steel). Aluminum foil is desired herein as the positive electrode collector 52.

The dimensions of the positive electrode collector 52 are not particularly limited, and may be determined as appropriate depending on the battery design. In a case where an aluminum foil is used as the positive electrode collector 52, the thickness of the foil is not particularly limited, and is, for instance, from 5 µm to 35 µm, desirably from 7 µm to 20 µm.

The positive electrode active material layer 54 contains a positive electrode active material. Examples of the positive electrode active material include lithium-transition metal composite oxides such as lithium-nickel composite oxides (for example, $LiNiO_2$), lithium-cobalt composite oxides (for example, $LiCoO_2$), lithium-nickel-cobalt-manganese composite oxides (for example, $LiNi_{1/3}Co_{1/3}Mn_{1/3}O_2$), lithium-nickel-cobalt-aluminum composite oxides (for example, $LiNi_{0.8}Co_{0.15}Al_{0.5}O_2$), lithium-manganese composite oxides (for example, $LiMn_2O_4$), lithium-nickel-manganese composite oxides (for example, $LiNi_{0.5}Mn_{1.5}O_4$) and the like; as well as lithium-transition metal phosphate compounds (for example, $LiFePO_4$).

The positive electrode active material layer 54 may contain components other than the positive electrode active material, for instance, trilithium phosphate, a conductive material and a binder. For instance, carbon black such as acetylene black (AB) or some other carbon material (for example, graphite) can be suitably used as the conductive material. For instance, polyvinylidene fluoride (PVDF) can be used as the binder.

The content of the positive electrode active material in the positive electrode active material layer 54 (i.e. the content of the positive electrode active material relative to the total mass of the positive electrode active material layer 54) is not particularly limited, but is desirably 70 mass % or higher, and is more desirably from 80 mass % to 97 mass %, and yet more desirably from 85 mass % to 96 mass %. The content of trilithium phosphate in the positive electrode active material layer 54 is not particularly limited, but is desirably from 1 mass % to 15 mass %, more desirably from 2 mass % to 12 mass %. The content of the conductive material in the positive electrode active material layer 54 is not particularly limited, but is desirably from 1 mass % to 15 mass %, more desirably from 3 mass % to 13 mass %. The content of the binder in the positive electrode active material layer 54 is not particularly limited, but is desirably from 1 mass % to 15 mass %, more desirably from 1.5 mass % to 10 mass %.

The thickness of the positive electrode active material layer 54 is not particularly limited, but is, for instance, from 10 μm to 300 μm, desirably from 20 μm to 200 μm.

A known negative electrode collector used in lithium ion secondary batteries can be used as the negative electrode collector 62, and examples thereof include sheets or foils made of a metal of good conductivity (for instance, copper, nickel, titanium or stainless steel). A copper foil is desired herein as the negative electrode collector 62.

The dimensions of the negative electrode collector 62 are not particularly limited, and may be determined as appropriate depending on the battery design. In a case where a copper foil is used as the negative electrode collector 62, the thickness of the foil is not particularly limited, and is, for instance, from 5 μm to 35 μm, desirably from 7 μm to 20 μm.

The negative electrode active material layer 64 contains the above-described graphite-based negative electrode active material as a negative electrode active material. So long as the effect of the present disclosure is not significantly impaired thereby, the negative electrode active material layer 64 may contain another negative electrode active material, in addition to the above-described graphite-based negative electrode active material.

The average particle size (median size: D50) of the negative electrode active material is not particularly limited, and is, for instance, from 0.1 μm to 50 μm, desirably from 1 μm to 25 μm, and more desirably from 5 μm to 20 μm. The average particle size (D50) of the negative electrode active material can be determined, for instance, by a laser diffraction/scattering method.

The negative electrode active material layer 64 can contain components such as a binder and a thickener, besides the active material. For instance, styrene butadiene rubber (SBR) or polyvinylidene fluoride (PVDF) can be used as the binder. For instance, carboxymethyl cellulose (CMC) or the like can be used as the thickener.

The content of the negative electrode active material in the negative electrode active material layer is desirably 90 mass % or higher, and is more desirably from 95 mass % to 99 mass %. The content of binder in the negative electrode active material layer is desirably from 0.1 mass % to 8 mass %, more desirably from 0.5 mass % to 3 mass %. The content of the thickener in the negative electrode active material layer is desirably from 0.3 mass % to 3 mass %, more desirably from 0.5 mass % to 2 mass %.

The thickness of the negative electrode active material layer 64 is not particularly limited, but is, for instance, from 10 μm to 300 μm, desirably from 20 μm to 200 μm.

Examples of the separator 70 include a porous sheet (film) made of a resin such as polyethylene (PE), polypropylene (PP), polyester, cellulose or polyamide. Such a porous sheet may have a single-layer structure, or a multilayer structure of two or more layers (for instance, a three-layer structure in which PP layers are laid on both faces of a PE layer). A heat resistant layer (HRL) may be provided on the surface of the separator 70.

The thickness of the separator 70 is not particularly limited, and is, for instance, from 5 μm to 50 μm, desirably from 10 μm to 30 μm.

The nonaqueous electrolyte typically contains a nonaqueous solvent and a supporting salt (electrolyte salt). For instance, organic solvents such as various carbonates, ethers, esters, nitriles, sulfones, and lactones that are used in electrolyte solutions of lithium ion secondary batteries in general can be utilized, without particular limitations, as the nonaqueous solvent. Desired among the foregoing are carbonates, concrete examples of which include ethylene carbonate (EC), propylene carbonate (PC), diethyl carbonate (DEC), dimethyl carbonate (DMC), ethyl methyl carbonate (EMC), monofluoroethylene carbonate (MFEC), difluoroethylene carbonate (DFEC), monofluoromethyldifluoromethyl carbonate (F-DMC) and trifluorodimethyl carbonate (TFDMC). Such nonaqueous solvents can be used singly or in combinations of two or more types, as appropriate.

As the electrolyte salt, there can be used, for instance, a lithium salt such as $LiPF_6$, $LiBF_4$ or lithium bis(fluorosulfonyl)imide (LiFSI), desirably $LiPF_6$ among the foregoing. The concentration of the supporting salt is desirably from 0.7 mol/L to 1.3 mol/L.

So long as the effect of the present disclosure is not significantly impaired thereby, the above nonaqueous electrolyte may contain components other than the above-described components, for instance, various additives, which may be a coating film-forming agent such as an oxalato complex; a gas generating agent such as biphenyl (BP) or cyclohexyl benzene (CHB); as well as a thickener.

The lithium ion secondary battery 100 can be used in various applications. Suitable examples of applications include drive power sources mounted on vehicles such as battery electric vehicles (BEV), hybrid electric vehicles (HEV), and plug-in hybrid electric vehicles (PHEV). Further, the lithium ion secondary battery 100 can be used as a storage battery of a small power storage device and the like. The lithium ion secondary battery 100 may also be used in the form of a battery pack typically resulting from connection of a plurality of batteries 100 in series and/or in parallel.

The explanation above concerns a square lithium ion secondary battery provided with a flat-shaped wound electrode body as an example. However, the graphite-based negative electrode active material according to the present embodiment can be used also in lithium ion secondary batteries of other types, in accordance with known methods. For instance, a lithium ion secondary battery having a multilayer electrode body (i.e. an electrode body resulting from alternate stacking of a plurality of positive electrodes and a plurality of negative electrodes) can be constructed using the graphite-based negative electrode active material according to the present embodiment. Further, a cylindrical lithium ion secondary battery or a laminate-cased lithium ion secondary battery can be constructed using the graphite-based negative electrode active material according to the present embodiment. Also a nonaqueous electrolyte secondary battery other than a lithium ion secondary battery can be configured, in accordance with a known method, using the graphite-based negative electrode active material according to the present embodiment.

Examples pertaining to the present disclosure will be explained in detail next, but the disclosure is not meant to be limited to the particulars illustrated in the examples.

Preparation of a Graphite-Based Negative Electrode Active Material

Comparative Example 1

Scaly graphite (manufactured by Ito Graphite Co., Ltd.) having an average particle size (D50) of about 15 μm was prepared as the graphite-based negative electrode active material of Comparative example 1.

Comparative Example 2

Scaly graphite (manufactured by Ito Graphite Co., Ltd.) having an average particle size (D50) of about 10 μm was prepared as the graphite-based negative electrode active material of Comparative example 2.

Comparative Example 3

Scaly graphite (manufactured by Ito Graphite Co., Ltd.) having an average particle size (D50) of about 5 μm was prepared as the graphite-based negative electrode active material of Comparative example 3.

Example 1

Scaly graphite having an average particle size (D50) of 15 μm and scaly graphite having an average particle size (D50) of 5 μm were mixed at a mass ratio of 7:3. This mixture was subjected to a granulation treatment at 4000 rpm for 120 minutes using a dry-type particle composing device "Nobilta Mini (NOB-MINI)" manufactured by Hosokawa Micron Corporation. A cross section of the obtained graphite-based negative electrode active material particles was observed by SEM, which revealed the presence of particles having a high-density flat central portion made up of graphite, and a low-density porous accumulation portion made up of accumulated graphite, on both sides of the flat central portion.

Example 2

Figure 4:
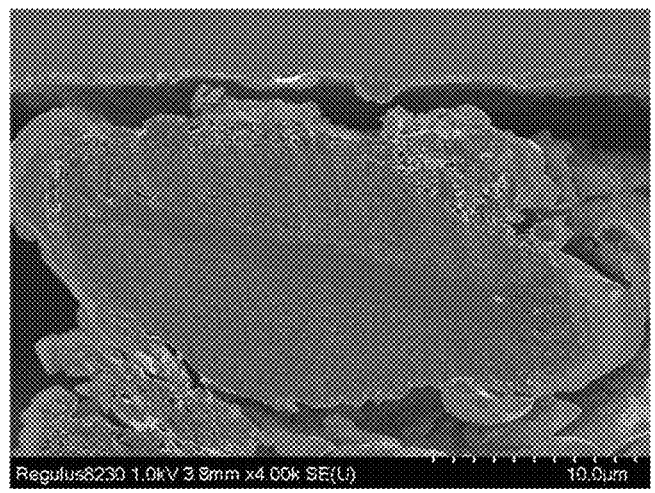
FIG. 4 is a scanning electron micrograph of a cross section of a graphite-based negative electrode material obtained in Example 2.

Scaly graphite having an average particle size (D50) of 15 μm and scaly graphite having an average particle size (D50) of 5 μm were mixed at a mass ratio of 6:4. This mixture was subjected to a granulation treatment at 4000 rpm for 120 minutes using a dry-type particle composing device "Nobilta Mini (NOB-MINI)" manufactured by Hosokawa Micron Corporation. A cross section of the obtained graphite-based negative electrode active material particles was observed by SEM, which revealed the presence of particles having a high-density flat central portion made up of graphite, and a low-density porous accumulation portion made up of accumulated graphite, on both sides of the flat central portion. This cross-sectional SEM image is shown in FIG. 4 for reference.

Example 3

Scaly graphite having an average particle size (D50) of 15 μm and scaly graphite having an average particle size (D50) of 5 μm were mixed at a mass ratio of 8:2. This mixture was subjected to a granulation treatment at 4000 rpm for 120 minutes using a dry-type particle composing device "Nobilta Mini (NOB-MINI)" manufactured by Hosokawa Micron Corporation. A cross section of the obtained graphite-based negative electrode active material particles was observed by SEM, which revealed the presence of particles having a high-density flat central portion made up of graphite, and a low-density porous accumulation portion made up of accumulated graphite, on both sides of the flat central portion.

Example 4

Scaly graphite having an average particle size (D50) of 15 μm and scaly graphite having an average particle size (D50) of 5 μm were mixed at a mass ratio of 9:1. This mixture was subjected to a granulation treatment at 4000 rpm for 120 minutes using a dry-type particle composing device "Nobilta Mini (NOB-MINI)" manufactured by Hosokawa Micron Corporation. A cross section of the obtained graphite-based negative electrode active material particles was observed by SEM, which revealed the presence of particles having a high-density flat central portion made up of graphite, and a low-density porous accumulation portion made up of accumulated graphite, on both sides of the flat central portion.

Comparative Example 4

Scaly graphite having an average particle size (D50) of 15 μm was subjected to a granulation treatment at 4000 rpm for 120 minutes using a dry-type particle composing device "Nobilta Mini (NOB-MIND)" manufactured by Hosokawa Micron Corporation. A cross section of the obtained graphite-based negative electrode active material particles was observed by SEM, which revealed that the particles are entirely porous.

Comparative Example 5

Scaly graphite having an average particle size (D50) of 15 μm and scaly graphite having an average particle size (D50) of 5 μm were mixed at a mass ratio of 7:3. This mixture was subjected to a granulation treatment at 4000 rpm for 240 minutes using a dry-type particle composing device "Nobilta Mini (NOB-MINI)" manufactured by Hosokawa Micron Corporation. A cross section of the obtained graphite-based negative electrode active material particles was observed by SEM, which revealed that the particles are entirely porous.

Pore Distribution Measurement

The pore distribution of each of the graphite-based negative electrode active materials of the examples and comparative examples was measured in accordance with a mercury intrusion porosimetry, and pore volume in range from 0.01 mL/g to 0.1 mL/g was determined. The results are given in Table 1.

SEM Observation Evaluation

The minor diameter A and major diameter of the flat central portion, as well as the thickness B of the porous accumulation portion were determined for of each of 20 or more particles in a cross-sectional SEM image of the graphite-based negative electrode active material particles of each example. On the basis of the obtained results, an average aspect ratio of the flat central portion and an average of the ratio of the thickness B of the porous accumulation portion relative to the minor diameter A of the flat central portion are determined. The results are given in Table 1.

Production of Lithium Ion Secondary Batteries for Evaluation

A slurry for forming a positive electrode active material layer was prepared by mixing $LiNi_{1/3}Co_{1/3}Mn_{1/3}O_2$ (LNCM) as a positive electrode active material powder, acetylene black (AB) as a conductive material and polyvinylidene fluoride (PVdF) as a binder, at a mass ratio of LNCM:AB:PVdF=92:5:3, in N-methylpyrrolidone (NMP). This slurry was applied onto the surface of an aluminum foil having a thickness of 15 μm, then dried and subjected to roll pressing, to produce a positive electrode sheet.

Slurries for forming a negative electrode active material layer were prepared by mixing a respective graphite-based negative electrode active material (C) of the examples and comparative examples, styrene butadiene rubber (SBR) as a binder and carboxymethyl cellulose (CMC) as a thickener, at a mass ratio of C:SBR:CMC=98:1:1, in ion-exchanged water. Each slurry was applied onto the surface of a copper foil having a thickness of 10 μm, then dried and subjected to roll pressing, to produce a respective negative electrode sheet.

Further, two separator sheets were prepared in which a 4 μm-thick ceramic particle layer (HRL) was formed on a 20 μm-thick porous polyolefin layer having a three-layer structure of PP/PE/PP.

The positive electrode sheet and each negative electrode sheet thus produced, and the two prepared separator sheets were superimposed and were wound, to produce respective wound electrode bodies. The HRL of each separator sheet was set herein to face the positive electrode sheet. Respective electrode terminals were attached, by welding, to the positive electrode sheet and the negative electrode sheet of each produced wound electrode body, and then the resultant was accommodated in a battery case having an injection port.

Then a nonaqueous electrolyte solution was injected through the injection port of the battery case, and the injection port was sealed hermetically with a sealing lid. As the nonaqueous electrolyte solution, a solution was used resulting from dissolving $LiPF_6$ as a supporting salt, to a concentration of 1.0 mol/L, in a mixed solvent that contained ethylene carbonate (EC), dimethyl carbonate (DMC) and ethyl methyl carbonate (EMC) at a volume ratio of 3:3:4. Thereafter, each battery was initially charged, and was subjected to an aging treatment at 60° C., to yield a respective lithium ion secondary battery for evaluation.

Evaluation of Output Characteristics

Each activated lithium ion secondary battery for evaluation was adjusted to SOC 60%, and was then placed in an environment at −10° C. Each lithium ion secondary battery for evaluation was then discharged for 2 seconds at a current value of 15C. The output (W) of the battery was calculated on the basis of the voltage and the current value at this time. A ratio of the output of each lithium ion secondary battery for evaluation that utilized a respective graphite-based negative electrode active material, of the other comparative examples and examples relative to the output of the lithium ion secondary battery for evaluation that utilized the graphite-based negative electrode active material of Comparative example 1 was determined, when the output of that of Comparative example 1 was taken as 100. The results are given in Table 1.

Evaluation of Cycle Characteristics

Each of the lithium ion secondary batteries for evaluation produced above was placed in an environment at 25° C. The lithium ion secondary battery for evaluation was charged at a constant current of 1/3C up to 4.1 V, and was then charged at constant voltage until the current value reached 1/50C, to bring thus the battery into a fully charged state. Next, the lithium ion secondary battery for evaluation was discharged at constant current at a current value of 1/3C, down to 3.0 V. The discharge capacity at this time was measured, to determine the initial capacity.

Each lithium ion secondary battery for evaluation was placed in an environment at 40° C., was charged at a constant current of 2C up to 4.1 V, and discharged at a constant current of 2C down to 3.0 V, and this charging and discharge cycle was repeated over 500 cycles. The discharge capacity after 500 cycles was determined in accordance with the same method as that for initial capacity. A capacity retention rate (%), as an index of cycle characteristics, was calculated from (discharge capacity after 500 cycles of charging and discharge/initial capacity)×100. The results are given in Table 1.

TABLE 1

| | Graphite-based negative electrode active material | | | | | Battery characteristics | |
|---|---|---|---|---|---|---|---|
| | Pore volume (mL/g) for 0.01-0.1 μm | Aspect ratio of flat central portion | Short-side length A of flat central portion (μm) | Thickness B of porous accumulation portion (μm) | Ratio B/A | Output characteristics (%) | Capacity retention rate (%) |
| Comp. ex. 1 | 0.002 | — | — | — | — | 100 | 76 |
| Comp. ex. 2 | 0.004 | — | — | — | — | 95 | 72 |
| Comp. ex. 3 | 0.002 | — | — | — | — | 94 | 71 |
| Example 1 | 0.035 | 5.7 | 1.3 | 2.0 | 1.55 | 105 | 79 |
| Example 2 | 0.041 | 10.5 | 2.0 | 4.4 | 2.27 | 103 | 81 |
| Example 3 | 0.033 | 4.3 | 1.8 | 3.0 | 1.67 | 106 | 82 |
| Example 4 | 0.031 | 2.1 | 6.6 | 10.0 | 1.52 | 107 | 83 |
| Comp. ex. 4 | 0.012 | — | — | — | — | 95 | 76 |
| Comp. ex. 5 | 0.009 | — | — | — | — | 94 | 76 |

The results in Table 1 reveal that a graphite-based negative electrode active material made up of a plurality of particles having, in a cross-sectional view, a high-density flat central portion made up of graphite and a low-density porous accumulation portion made up of accumulated graphite, on both sides of the flat central portion, i.e. the graphite-based negative electrode active material disclosed herein, can impart both high output characteristics and high cycle characteristics to a nonaqueous electrolyte secondary battery.

Concrete examples of the present disclosure have been explained in detail above, but the examples are merely illustrative in nature, and are not meant to limit the scope of the claims in any way. The art set forth in the claims encompasses various alterations and modifications of the concrete examples illustrated above.

What is claimed is:

1. A graphite-based negative electrode active material made up of particles which comprise, in a cross-sectional view,
    a flat central portion made up of graphite; and
    a porous accumulation portion made up of accumulated graphite, on both sides of the flat central portion,
    wherein the graphite that makes up the flat central portion is present more densely than the graphite that makes up the porous accumulation portion, and
    a pore volume for a range of pore diameter from 0.01 μm to 0.1 μm is not less than 0.025 mL/g but not more than 0.045 mL/g.

2. The graphite-based negative electrode active material according to claim 1, wherein an average aspect ratio of the flat central portion is not less than 1.8 but not more than 12.

3. The graphite-based negative electrode active material according to claim 1, wherein a ratio of the thickness of the porous accumulation portion relative to a minor diameter of the flat central portion is not less than 1.25 but not more than 2.5.

4. A nonaqueous electrolyte secondary battery comprising a positive electrode, a negative electrode, and a nonaqueous electrolyte, wherein the negative electrode includes the graphite-based negative electrode active material according to claim 1.

* * * * *